No. 894,979. PATENTED AUG. 4, 1908.
J. S. PECK.
LOAD EQUALIZER FOR ELECTRIC CIRCUITS.
APPLICATION FILED NOV. 15, 1907.
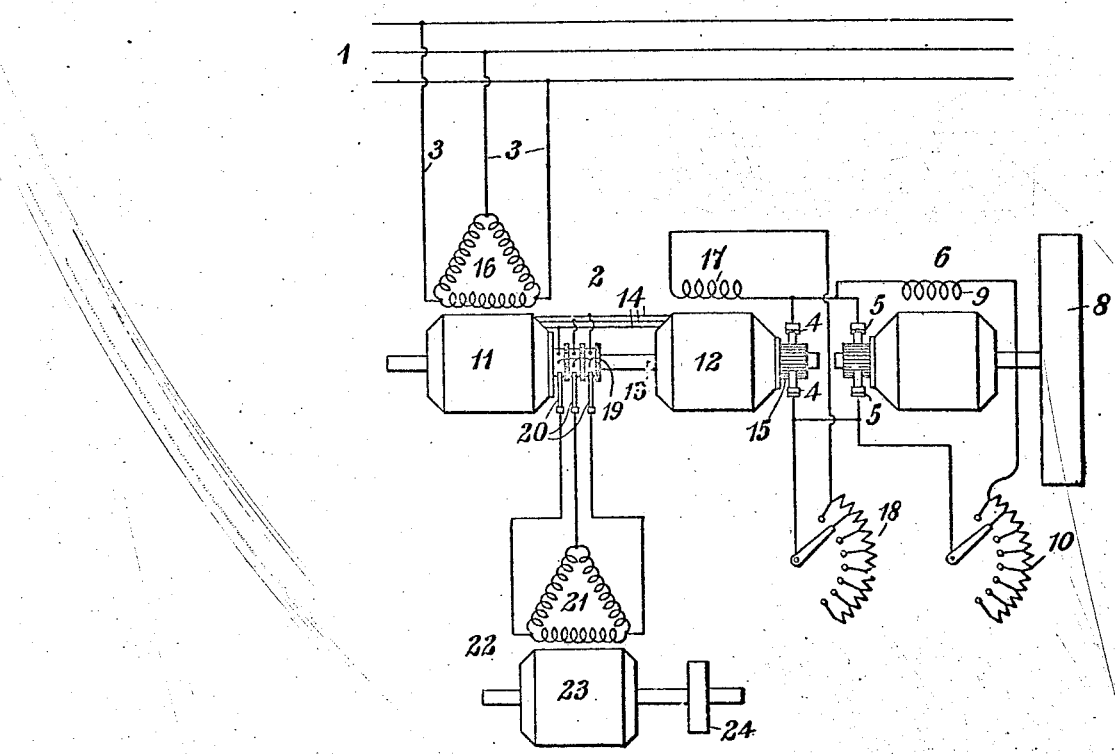
WITNESSES:
C. L. Belcher
Otto S. Schairer
INVENTOR
John S. Peck
BY
Wesley G. Carr
ATTORNEY

UNITED STATES PATENT OFFICE.

JOHN SEDGWICK PECK, OF MANCHESTER, ENGLAND, ASSIGNOR TO T. H. GIVEN, H. S. A. STEWART, AND E. M. HERR, OF PITTSBURG, PENNSYLVANIA, RECEIVERS OF WESTINGHOUSE ELECTRIC & MANUFACTURING COMPANY, OF EAST PITTSBURG, PENNSYLVANIA, A CORPORATION OF PENNSYLVANIA.

LOAD-EQUALIZER FOR ELECTRIC CIRCUITS.

No. 894,979.
Specification of Letters Patent.
Patented Aug. 4, 1908.

Application filed November 15, 1907. Serial No. 402,278.

*To all whom it may concern:*

Be it known that I, JOHN SEDGWICK PECK, a citizen of the United States, and a resident of Manchester, in the county of Lancaster, England, have invented a new and useful Improvement in Load-Equalizers for Electric Circuits, of which the following is a specification.

My invention relates to alternating current systems of electrical distribution and particularly to apparatus for equalizing the loads on such systems.

One means heretofore proposed for equalizing the load on an alternating current supply system comprises a rotary converter having its alternating current side connected to the supply circuit which may be either single or polyphase. The direct current brushes of the rotary converter are connected to the brushes of a direct current generator, the rotor of which is provided with a fly wheel. The field magnet of the latter machine is excited by a shunt winding the circuit of which includes a rheostat arranged to be so operated as to vary the field excitation, either at will or in accordance with the load on the supply circuit.

In a number of cases, for instance in collieries, rolling mills and the like, in which a slow-speed induction motor is employed for direct connection to the winding drum or the rolling mill, if the frequency of the supply circuit is high, the large number of poles required to obtain the slow speed necessitates an extremely heavy motor the cost of which is often excessive.

The present invention has for its object to obviate this disadvantage and it consists in replacing the rotary converter of the equalizing system above mentioned by a rotary converter of a special type and in operating the slow-speed induction motor by electrical energy obtained from intermediate points in the windings of such rotary converter.

My invention is illustrated in the single figure of the accompanying drawing which is a diagrammatic view of a system embodying the invention.

Referring now to the drawing, a three phase supply circuit is indicated at 1 to which a rotary converter 2 is connected by means of conductors 3. The direct current brushes 4 of the rotary converter are connected, as stated above, to the brushes 5 of a direct current dynamo-electric machine 6, the rotor of which is provided with a fly wheel 8.

The field magnet of the machine 6 is excited by a shunt winding 9 in the circuit of which a rheostat 10 is connected in order to vary the excitation of the machine 6, either at will or automatically, in accordance with the load on the supply circuit 1.

The rotary converter 2 comprises two separate rotors 11 and 12 mounted on the same shaft 13 and electrically connected together by means of cross connecting conductors 14.

The conductors 14 are so arranged as to connect together the symmetrically situated points in the windings of the rotors 11 and 12 and the winding of the rotor 12 is also connected to the segments of a commutator cylinder 15 in the usual manner.

The two rotors 11 and 12 of the rotary converter 2 are respectively provided with stator windings 16 and 17, the winding 16 being of the induction motor type while the winding 17 is of the ordinary direct current type and, as shown in the figure, is a shunt winding connected across the brushes 4 through a rheostat 18.

Each of the electrical cross connectors 14 between the windings of the rotors 11 and 12 is supplied with a slip ring 19 and brushes 20 bear upon these slip rings and are connected to the stator winding 21 of the working motor 22 which is here shown as an induction motor having its rotor 23 connected to a winding drum or rolling mill by means of a pulley or coupling 24.

The cross connections 14 of the rotary converter 2 may be three or more in number and all, or a part only, may be connected to the slip rings 19 from which the working motor 22 is supplied with energy.

The operation of the apparatus is as follows: The two cross connected rotors 11 and 12 with their respective stators 16 and 17 constitute a rotary converter the speed of which will depend upon the sum of the numbers of poles in the two stator windings 16 and 17 and is equal to the number of alternations per minute in the supply circuit divided by the sum of the numbers of poles in the two stators.

The cross connecting conductors 14 and the slip rings 19 will be traversed by alternating current energy at a frequency of alternations per minute which is equal to the speed of the combined rotors 11 and 12 in revolutions per minute, multiplied by the number of poles of the direct current stator 17.

The following example will illustrate this:

*For a 50 period circuit.*

| No. of poles of stator 17. | No. of poles of stator 16. | Speed (revolutions per minute.) | Frequency on slip rings 19 (periods.) |
|---|---|---|---|
| 6 | 6 | 500 | 25 |
| 8 | 4 | 500 | 33⅓ |
| 4 | 8 | 500 | 16⅔ |

It will thus be seen that, so long as the two stators 16 and 17 have the same number of poles, currents having one-half the line frequency may be obtained on the slip rings 19. If, however, the two stators have different numbers of poles, the frequency on the slip rings will be greater or less than half the line frequency, depending upon whether the direct current stator 17 or the induction motor stator 16 has the greater number of poles. Any desired frequency may thus be obtained for supplying the working motor and this frequency may be so selected that the design of the motor may be most economical and at the same time an equalization of the load on the supply circuit may be effected. The power factor of the current taken from the supply circuit by the rotary converter may be adjusted in the usual way by varying the excitation of the direct current stator 17 of the rotary converter.

I claim as my invention:

1. In an equalizing system for alternating current circuits, the combination with a rotary converter having two mechanically and electrically connected rotors and independent stator windings one of which is connected to the circuit to be regulated, of a dynamo-electric machine electrically connected to one of the members of the rotary converter and provided with a fly wheel, and an induction motor having its stator winding connected to the rotor windings of the rotary converter.

2. An alternating current load-equalizing system comprising a rotary converter having two mechanically and electrically connected rotors and independent stator windings one of which is connected to the circuit to be regulated, an induction motor having its stator winding connected to the motor windings of the rotary converter, and a dynamo-electric machine having a fly wheel and a shunt field magnet winding and having its armature electrically connected to one of the members of the rotary converter.

3. In an equalizing system for alternating current circuits, the combination with a rotary converter having two mechanically and electrically connected rotors and independent stator windings one of which is connected to the circuit to be regulated, of a dynamo-electric machine having a fly wheel and a shunt field magnet winding and having its armature connected to both the rotor and stator windings of one of the members of the rotary converter, and an induction motor having its stator winding connected to the rotor windings of the rotary converter.

4. In an equalizing system, the combination with a dynamo-electric machine provided with a fly wheel, and a rotary converter having two electrically and mechanically connected rotors and having one rotor winding and the corresponding stator winding connected in parallel to the said dynamo-electric machine, the other stator winding being connected to the circuit to be regulated, of an induction motor having its stator winding connected to the rotor windings of the rotary converter.

5. In an equalizing system, the combination with a shunt wound dynamo-electric machine provided with a fly wheel, and a rotary converter having two electrically and mechanically connected rotors and having one rotor winding and the corresponding stator winding connected in parallel to the said dynamo-electric machine, the other stator winding being connected to the circuit to be regulated, of an induction motor having its stator winding connected to the rotor windings of the rotary converter.

In testimony whereof, I have hereunto subscribed my name this first day of November, 1907.

JOHN SEDGWICK PECK.

Witnesses:
 FLORENCE HOLMES,
 GEORGE WILLIAM PINNER.